(12) United States Patent
Clark

(10) Patent No.: US 7,677,469 B1
(45) Date of Patent: Mar. 16, 2010

(54) SPRINKLER WITH REVERSING PLANETARY GEAR DRIVE

(75) Inventor: Michael L. Clark, San Marcos, CA (US)

(73) Assignee: Hunter Industries, Inc., San Marcos, CA (US)

( * ) Notice: Subject to any disclaimer, the term of this patent is extended or adjusted under 35 U.S.C. 154(b) by 294 days.

(21) Appl. No.: 11/761,911

(22) Filed: Jun. 12, 2007

(51) Int. Cl.
*B05B 3/16* (2006.01)

(52) U.S. Cl. .................. 239/242; 239/203; 239/237; 239/240

(58) Field of Classification Search ......... 239/203–206, 239/237, 240, 241, 242, 263, 264
See application file for complete search history.

(56) References Cited

U.S. PATENT DOCUMENTS

| | | | | |
|---|---|---|---|---|
| 4,204,642 | A | 5/1980 | Hunter | 239/191 |
| 4,265,404 | A | 5/1981 | Hunter | 239/186 |
| 4,301,967 | A | 11/1981 | Hunter | 239/99 |
| 4,501,391 | A | 2/1985 | Hunter | 239/97 |
| 4,568,023 | A | 2/1986 | Hayes | 239/242 |
| RE32,386 | E | 3/1987 | Hunter | 239/206 |
| 4,784,329 | A | 11/1988 | Heren | 239/498 |
| 4,892,252 | A | 1/1990 | Bruninga | 239/205 |
| 5,174,501 | A * | 12/1992 | Hadar | 239/242 |
| 5,330,103 | A * | 7/1994 | Eckstein | 239/242 |
| 5,511,727 | A | 4/1996 | Heren et al. | 239/242 |
| 5,645,218 | A | 7/1997 | Heren et al. | 239/242 |
| 5,662,545 | A | 9/1997 | Zimmerman et al. | 475/344 |
| 5,938,122 | A | 8/1999 | Heren et al. | 239/242 |
| 6,042,021 | A | 3/2000 | Clark | 239/205 |
| 6,491,235 | B1 | 12/2002 | Scott et al. | 239/206 |
| 6,604,697 | B1 | 8/2003 | Heren et al. | 239/723 |
| 7,017,831 | B2 * | 3/2006 | Santiago et al. | 239/206 |
| 7,028,920 | B2 | 4/2006 | Hekman et al. | 239/240 |
| 2006/0049275 | A1 | 3/2006 | Santiago et al. | 239/240 |

OTHER PUBLICATIONS

Rain Bird 7005 Full/Part-Circle Rotor Pop-Up Sprinkler—Rain Bird 2005-2006 Catalog, p. 88.
Toro 2001 Series Commercial including Data & Performance Charts, pp. 58-59.
Nelson Pro 7000, 7500 & Nelson Pro 5500, 6000, 6500 Data Sheets, pp. 36-37.

* cited by examiner

*Primary Examiner*—Steven J Ganey
(74) *Attorney, Agent, or Firm*—Michael H. Jester

(57) ABSTRACT

A sprinkler for irrigating turf and/or landscaping includes a turbine and a nozzle. A planetary gear drive and a reversing mechanism rotatably coupling the turbine and the nozzle. The planetary gear drive includes at least a portion of the reversing mechanism.

20 Claims, 14 Drawing Sheets

SPRINKLER WITH REVERSING PLANETARY GEAR DRIVE

FIELD OF THE INVENTION

The present invention relates apparatus for irrigating turf and landscaping, and more particularly, to rotor-type sprinklers having a turbine that rotates a nozzle through a gear train reduction.

BACKGROUND OF THE INVENTION

In many parts of the United States, rainfall is insufficient and/or too irregular to keep turf and landscaping green and therefore irrigation systems are installed. Such systems typically include a plurality of underground pipes connected to sprinklers and valves, the latter being controlled by an electronic irrigation controller. One of the most popular types of sprinklers is a pop-up rotor-type sprinkler. In this type of sprinkler a tubular riser is normally retracted into an outer cylindrical case by a coil spring. The case is buried in the ground and when pressurized water is fed to the sprinkler the riser extends. A turbine and a gear train reduction are mounted in the riser for rotating a nozzle turret at the top of the riser. The gear train reduction is often encased in its own housing and is often referred to as a gear box. A reversing mechanism is also normally mounted in the riser along with an arc adjustment mechanism.

The gear box of a rotor-type sprinkler can include a series of staggered gears and shafts wherein a small gear on the top of the turbine shaft drives a large gear on the lower end of an adjacent second shaft. Another small gear on the top of the second shaft drives a large gear on the lower end of a third shaft, and so on. Alternately, the gear box can comprise a planetary arrangement in which a central shaft carries a sun gear that simultaneously drives several planetary gears on rotating circular partitions or stages that transmit reduced speed rotary motion to a succession of similar rotating stages. It is common for the planetary gears of the stages to engage corresponding ring gears formed on the inner surface of the gear box housing. See, for example, U.S. Pat. No. 5,662,545 granted to Zimmerman et al. A planetary gear box is desirable from the standpoint of being more compact, yet more robust, than a staggered gear box.

Two basic types of reversing mechanisms have been employed in commercial rotor-type sprinklers. In one design a reversing stator switches water jets that alternately drive the turbine from opposite sides to reverse the rotation of the turbine and the gear box. See for example, U.S. Pat. No. 4,625,914 granted to Sexton et al. The reversing stator design typically employs a long metal shaft that can twist relative to components rigidly mounted on the shaft and undesirably change the reverse point. Users setting the arc of sprinklers that employ a reversing stator design do not get a tactile feel for a stop at the set reverse points. Turbines in reversing stator designs usually do not produce much power.

A more popular design for the reversing mechanism of a rotor-type sprinkler includes four pinion gears meshed together and mounted between arc-shaped upper and lower frames that rock back and forth with the aid of Omega-shaped over-center springs. One of the inner pinion gears is driven by the gear box and the pinion gears on opposite ends of the frames alternately engage a bull gear assembly. See for example, U.S. Pat. Nos. 3,107,056; 4,568,024; 4,624,412; 4,718,605; and 4,948,052, all granted to Edwin J. Hunter, the founder of Hunter Industries, Inc., the assignee of the subject application. The entire disclosures of said patents are hereby incorporated by reference. While the reversing frame design has been enormously successful, it is not without its own shortcomings. It involves a complicated assembly with many parts and can have operational failures. The main drawback of the reversing frame design is that the pinion gears are relatively weak compared to the gears in the gear box. Therefore, it is not uncommon for the pinion gears to break, wear out, or become stripped during operation of this kind of rotor-type sprinkler.

Non-revering, full circle rotation sprinklers such as golf rotors and stream sprinklers have been commercialized that have incorporated planetary gear boxes. Rotor-type sprinklers have also been commercialized that have combined planetary gear boxes and reversing mechanisms, however, in all such sprinklers all parts of the reversing mechanisms have been external to the gear box. See for example, U.S. Pat. No. 4,892,252 granted to Bruniga.

SUMMARY OF THE INVENTION

In accordance with the present invention, a sprinkler includes a turbine and a nozzle. A planetary gear drive and a reversing mechanism rotatably couple the turbine and the nozzle. The planetary gear drive includes at least a portion of the reversing mechanism.

DETAILED DESCRIPTION

Figure 1:
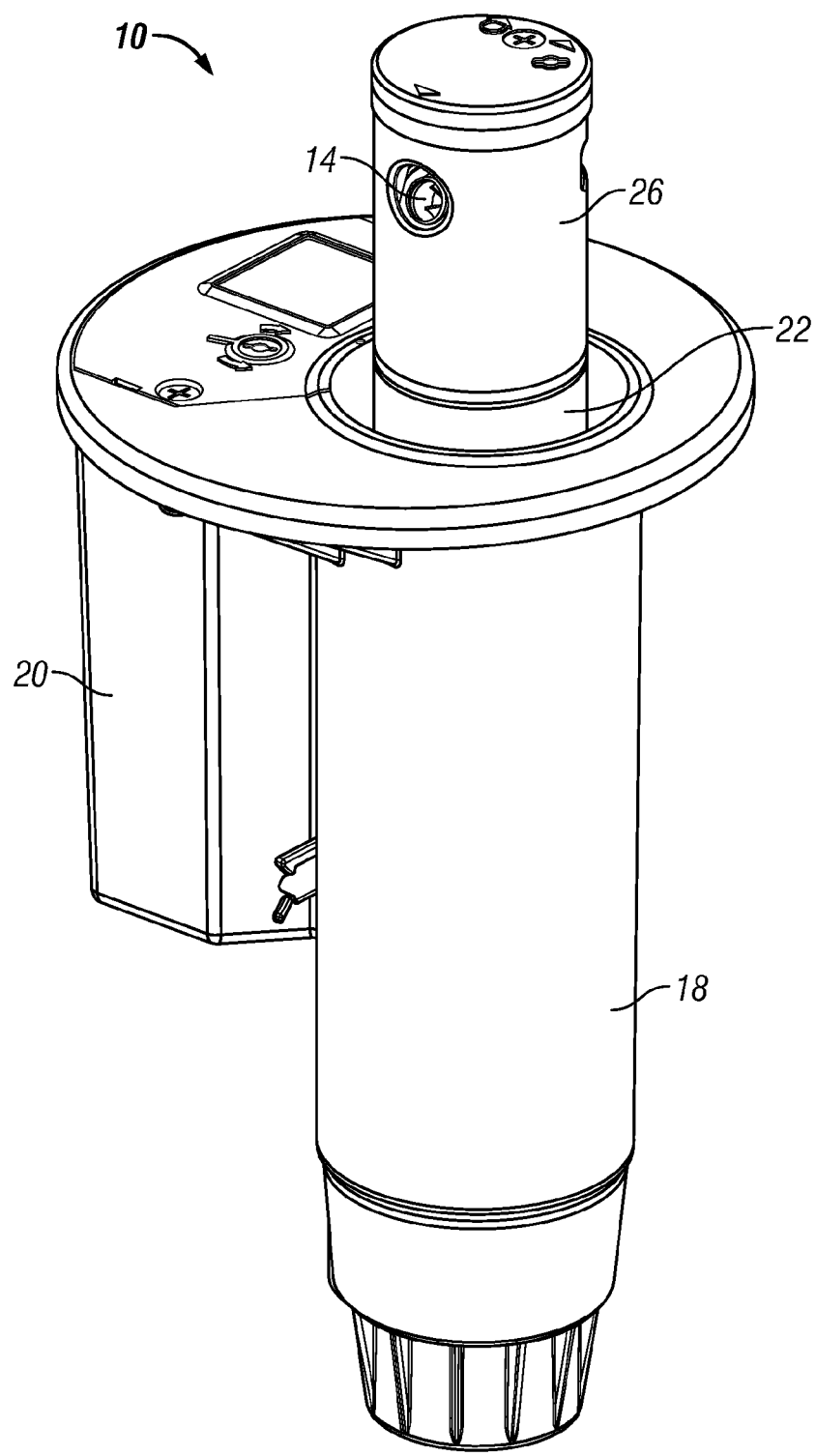
FIG. 1 is an isometric view of a rotor-type sprinkler incorporating an embodiment of the present invention.
Figure 2:
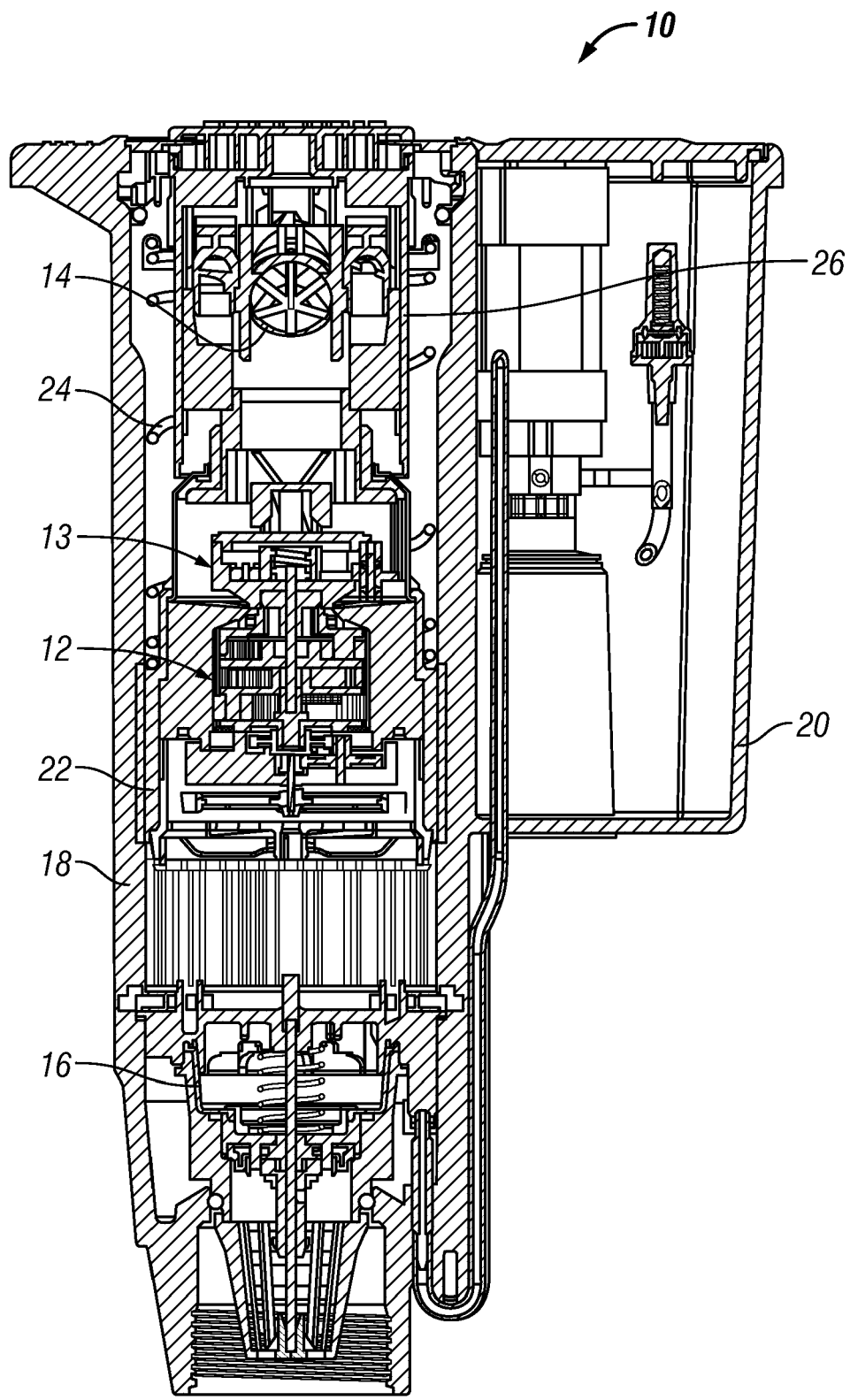
FIG. 2 is a vertical sectional view of the sprinkler of FIG. 1.

Referring to FIGS. 1 and 2, a rotor-type sprinkler 10 incorporates a reversing planetary gear drive 12 (FIG. 2) that rotates or oscillates a nozzle 14 between pre-set arc limits. Except for the reversing planetary gear drive 12, and the additional reversing mechanism 13 associated therewith, the sprinkler 10 generally has the construction disclosed in U.S. Pat. No. 6,491,235 of Scott et al. granted Dec. 10, 2002, assigned to Hunter Industries, Inc., the entire disclosure of which is hereby incorporated by reference. The sprinkler 10 (FIG. 1) is a valve-in-head sprinkler that incorporates a valve 16 in the bottom of a cylindrical outer case 18 which is opened and closed by valve actuator components contained in a housing 20 on the side of the case 18. The sprinkler 10 includes a generally tubular riser 22. A coil spring 24 (FIG. 2) normally holds the riser 22 in a retracted position within the outer case 18. The nozzle 14 is carried inside a cylindrical nozzle turret 26 rotatably mounted to the upper end of the riser 22. The coil spring 24 is compressible to allow the riser 22 and nozzle turret 26 to telescope from their retracted positions to their extended positions illustrated in FIG. 1 when pressurized water is introduced into the bottom of the outer case 18.

Figure 3:
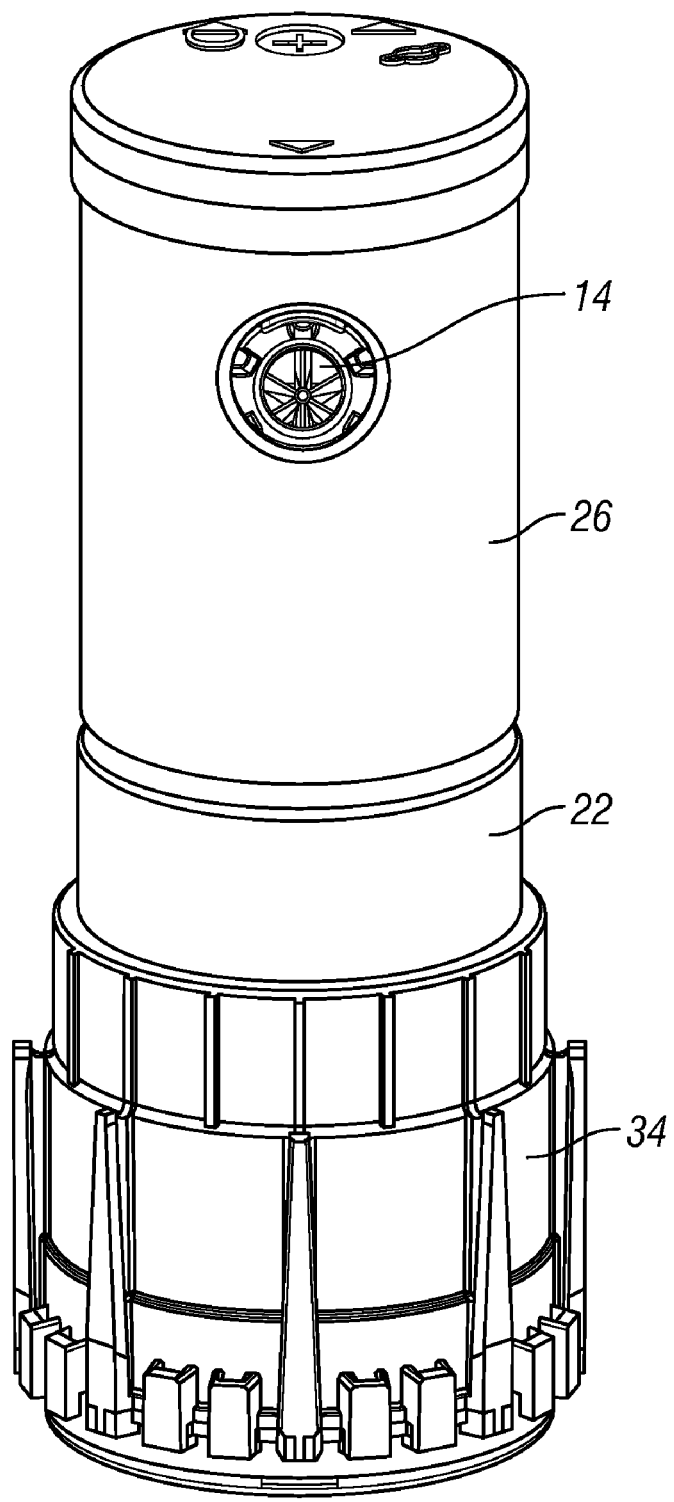
FIG. 3 is an isometric view of the riser and nozzle turret of the sprinkler of FIG. 1.
Figure 4:
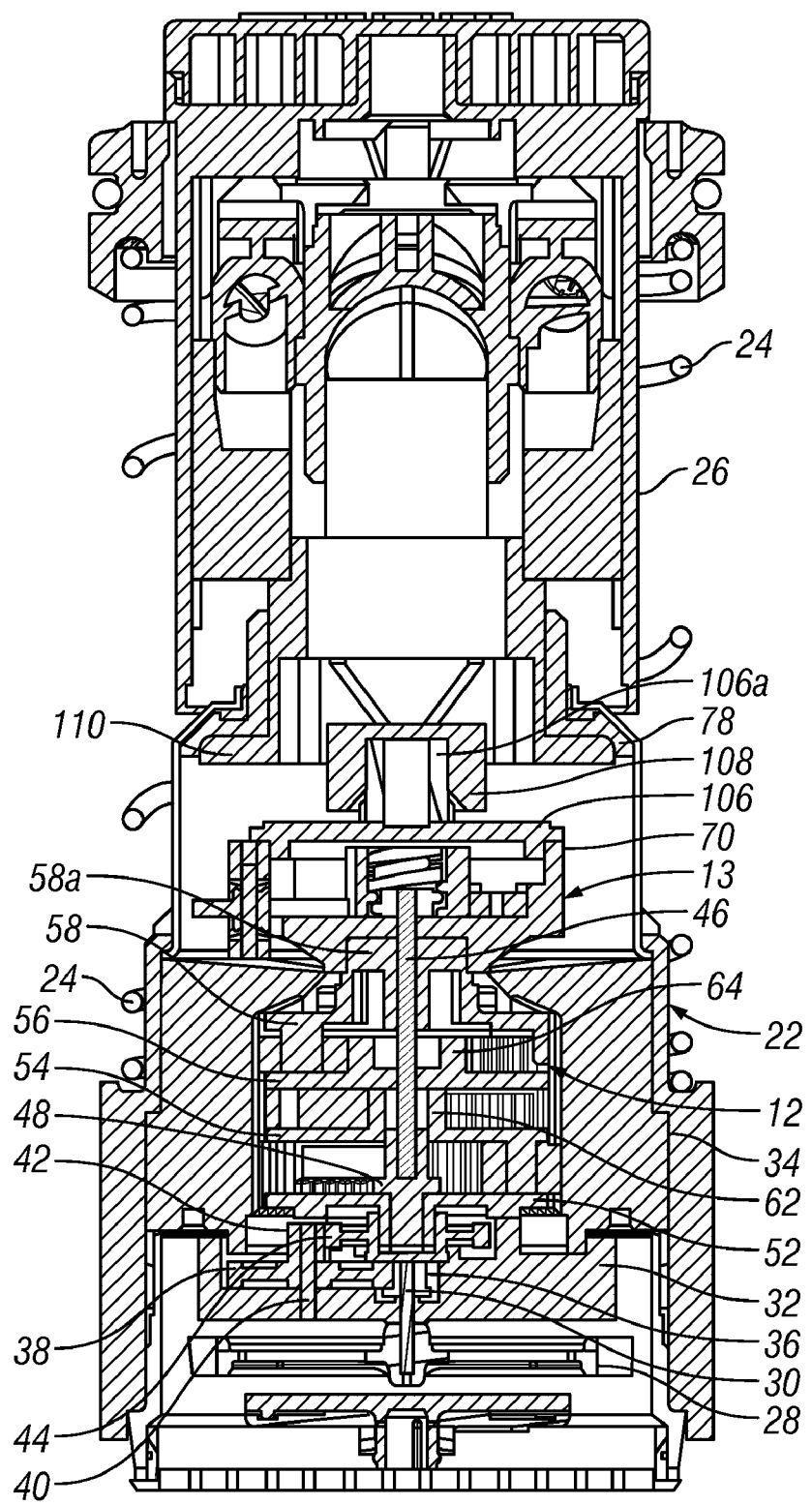
FIG. 4 is a vertical sectional view of the riser, nozzle turret and reversing planetary gear drive of the sprinkler of FIGS. 1 and 2.

FIGS. 3 and 4 illustrate further details of the riser 22, nozzle turret 26 and reversing planetary gear drive 12. A turbine 28 (FIG. 4) is rigidly secured to the lower end of a drive input pinion shaft 30. The pinion shaft 30 extends through the lower cap 32 of a cylindrical gear box 34 (FIG. 3) of the reversing planetary gear drive 12 that effectively forms the riser 22. A turbine pinion gear 36 (FIG. 4) is rigidly secured to the upper end of the pinion shaft 30. The turbine pinion gear 36 drives a lower spur gear 38 rigidly secured to a spur gear shaft 40 that also extends through the lower cap 32. Another pinion gear 42 is integrally formed on top of the lower spur gear 38 and drives an upper spur gear 44 of the reversing planetary gear drive 12.

Figure 5:
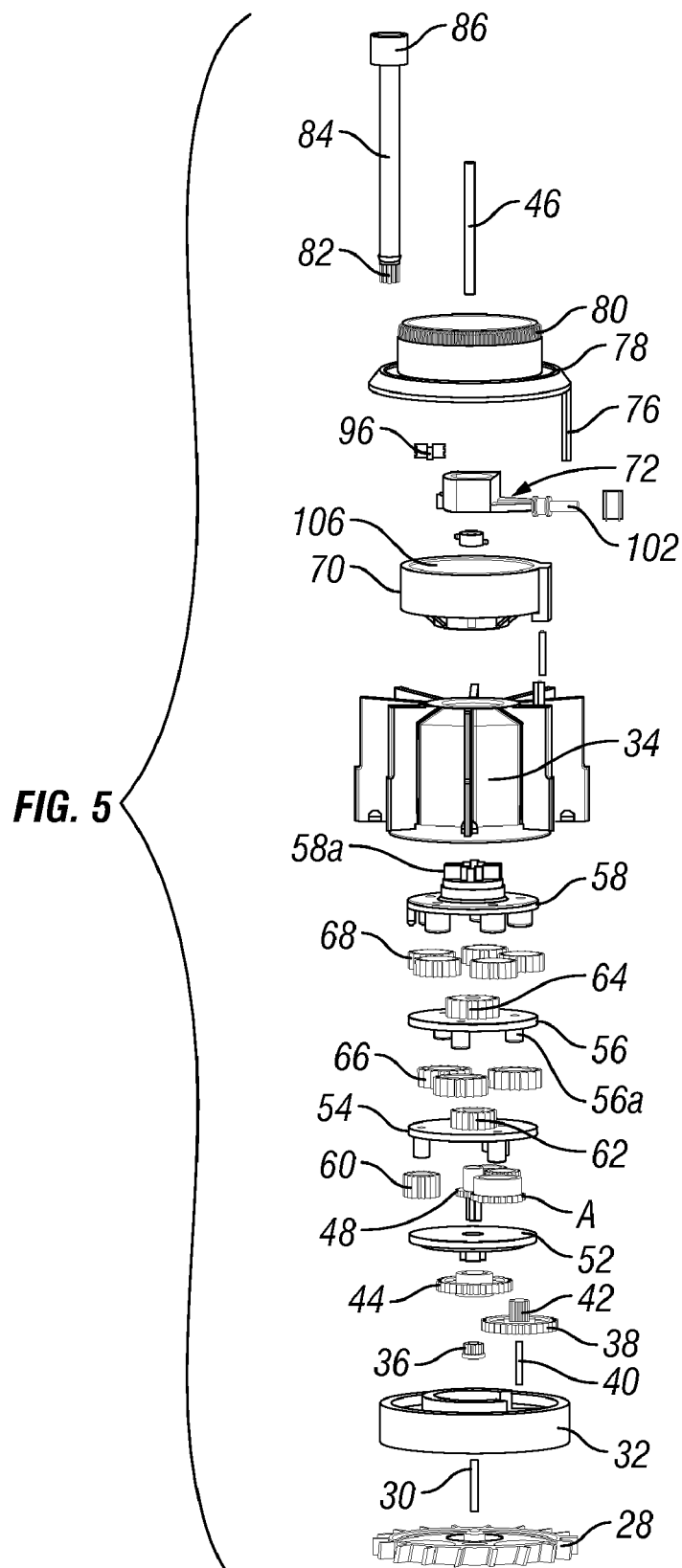
FIG. 5 is an exploded isometric view of the components of the reversing planetary gear drive and the associated reversing mechanism of the sprinkler of FIGS. 1 and 2.
Figure 6:
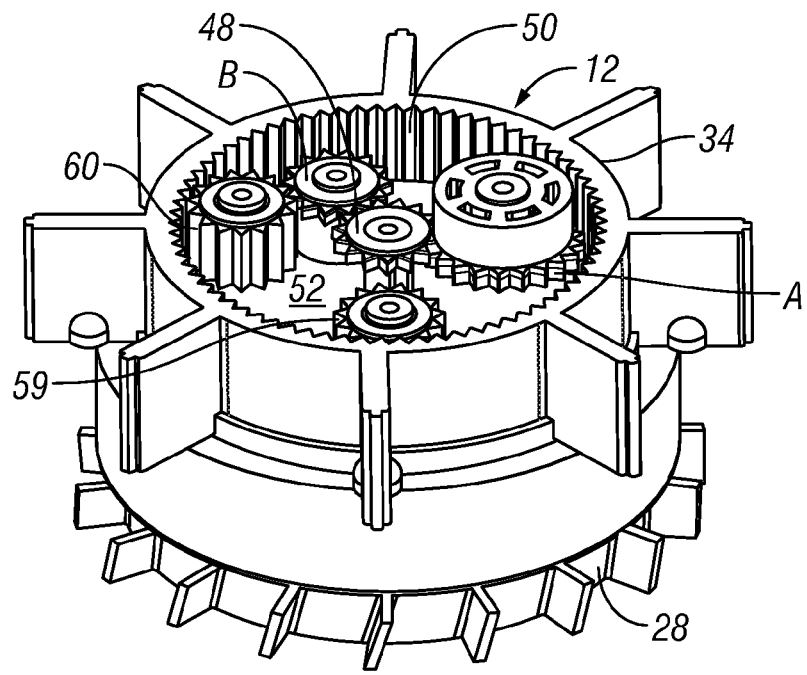
FIG. 6 is an enlarged cross-sectional fragmentary view illustrating a raised shift state of the shift gear of the reversing planetary gear drive.
Figure 7:
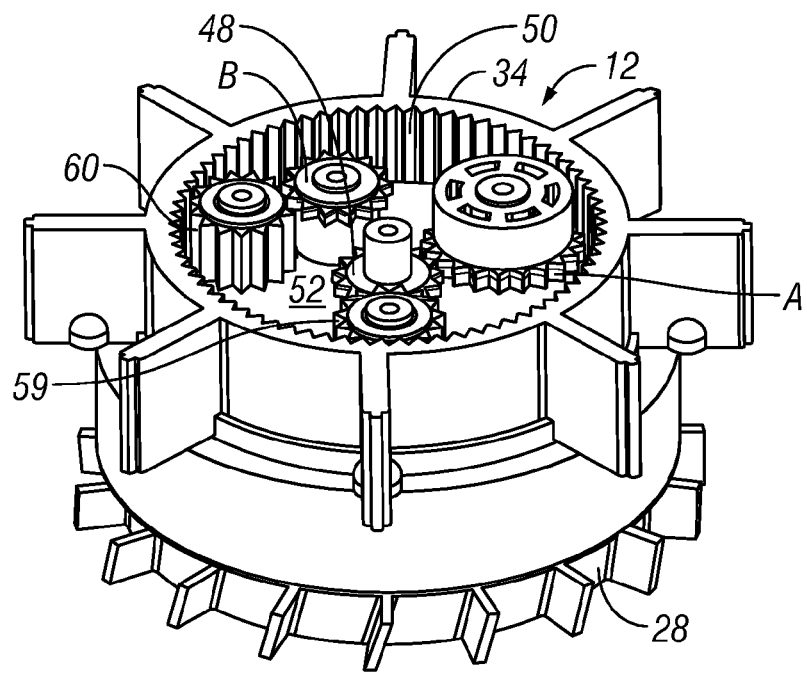
FIG. 7 is a view similar to FIG. 6 illustrating a lowered state of the shift gear of the reversing planetary gear drive.
Figure 8:
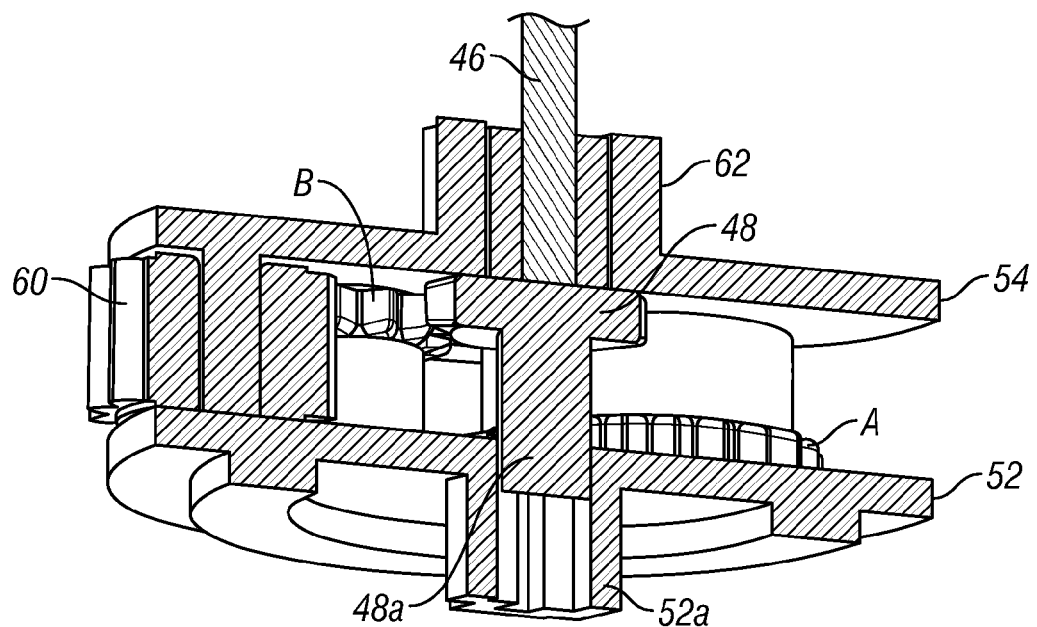
FIG. 8 is an enlarged, fragmentary view of a portion of FIG. 6 illustrating the raised state of the shift gear.
Figure 9:
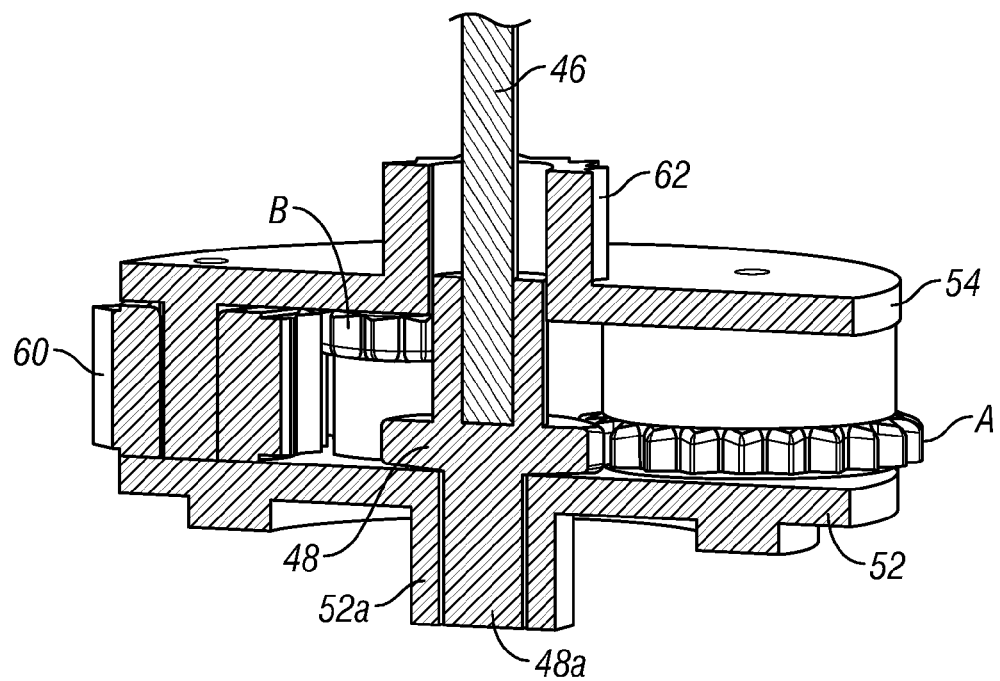
FIG. 9 is an enlarged, fragmentary view of a portion of FIG. 7 illustrating the lowered state of the shift gear.
Figure 13:
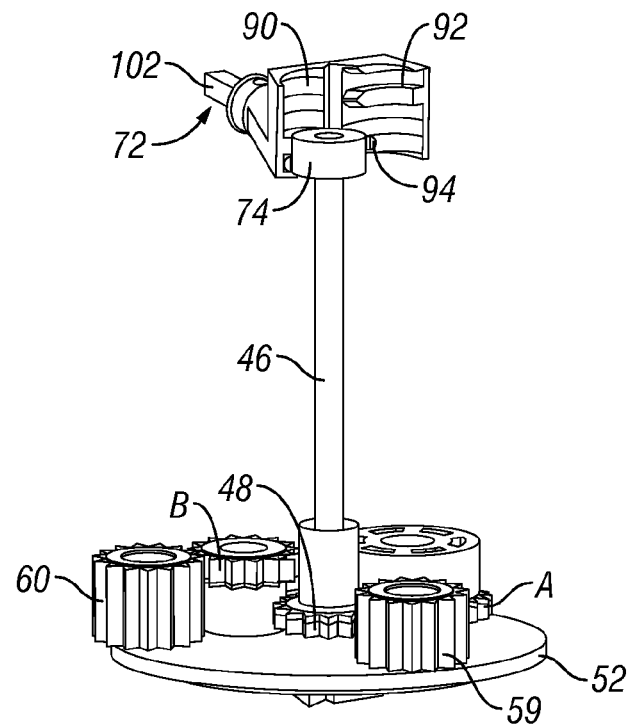

The reversing planetary gear drive 12 has a centrally located main drive shaft 46 (FIGS. 4, 8 and 9). The lower end of the drive shaft 46 is rigidly coupled to a shift sun gear 48 which is vertically reciprocated by axial movement of the drive shaft 46 between a raised state (FIGS. 6, 8 and 10) and a lowered state (FIGS. 7, 9 and 13). The interior wall of the cylindrical gear box 34 forms a ring gear 50 (FIGS. 6 and 7) comprising a plurality of circumferentially spaced, vertically extending, radially inwardly projecting teeth that are engaged by the various planet gears of the reversing planetary gear drive 12. As best seen in FIG. 5, the reversing planetary gear drive 12 includes a third stage carrier 52, a fourth stage carrier 54, a fifth stage carrier 56 and an output stage or carrier 58 which rotate around the drive shaft 46. A central cross-shaped opening in the upper spur gear 44 is drivingly coupled to a cross-shaped extension 52a (FIG. 8) of the third stage carrier 52. A lower cross-shaped extension 48a of the shift sun gear 48 slides up and down in a complementary cross-shaped opening in the cross-shaped extension 52a of the third stage carrier 52. Thus the upper spur gear 44 continuously rotates the shift sun gear 48 and the drive shaft 46 during vertical movement of the shift sun gear 48.

When the shift sun gear 48 is in its lowered state (FIGS. 7 and 9) it engages and meshes with a complementary shift gear A. When the shift sun gear 48 is in its raised state (FIG. 6) it engages and meshes with a complementary shift gear B. A planet gear 59 (FIGS. 6 and 7) functions as a support to maintain the alignment of all the gears associated with the third stage carrier 52. The shift gear A is directly engaged with the ring gear 50 formed on the interior wall of the gear box 34 whereas the shift gear B engages a transfer gear 60 which in turn engages the ring gear 50. Thus the direction of rotation subsequently carried through the remaining stages of the reversing planetary gear drive 12 is reversed by up and down movement of the drive shaft 46 and the shift sun gear 48 carried therewith. The level of rotational torque on the shift gears A and B is very low since they rotate at relatively high RPM. The meshing of the shift sun gear 48 with the shift gears A and B is very smooth.

Referring again to FIGS. 4 and 5, the reversing planetary gear drive 12 further includes sun gears 62 and 64 and operatively associated sets of planet gears 66 and 68, respectively. The shift gear A, the transfer gear 60 and the planet gears 66 and 68 all rotate about corresponding fixed cylindrical posts that extend downwardly from the stages immediately above the same. For example the planet gears 66 rotate about posts 56a (FIG. 5) on the fifth stage carrier 56. The shift gear A and the transfer gear 60 effectively operate as planet gears. All of the planet gears are driven by their respective sun gears and are also engaged with the ring gear 50 formed on the inside surface of the gear box 34. Each sun gear is rigidly secured to, or integrally formed with, its stage carrier. In this fashion, the RPM of the upper spur gear 44 is successively reduced by the planetary gear drive 12 so that the final output RPM of the output stage 58 is relatively low. For example, the turbine 28 may rotate at eight hundred RPM and the output stage 58 may rotate at an RPM of less than one.

Figure 21:
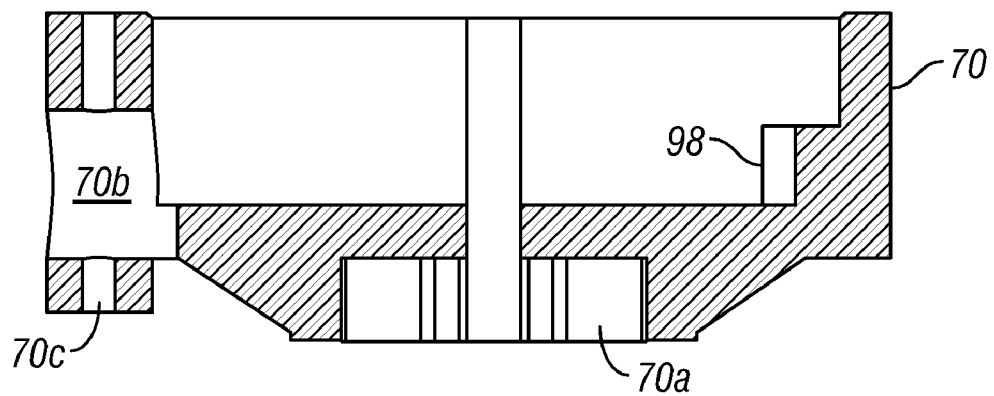
FIG. 21 is a still further enlarged vertical sectional view of the revering housing taken along line 21-21 of FIG. 20.

A cross-shaped top piece 58a (FIG. 5) on the output carrier 58 fits into a conformably shaped recess 70a (FIG. 21) in a reversing assembly housing 70 (FIG. 4) of the reversing mechanism 13. The fast spinning turbine 28 can slowly rotate the reversing assembly housing 70 through the gear train reduction inside the gear box 34. The drive shaft 46 rotates at a rate much lower than the RPM of the turbine 28 but at a rate much higher than that of the reversing assembly housing 70 so that the rotation of the reversing assembly housing 70, and the nozzle turret 26 coupled thereto, can be reversed in relatively rapid fashion.

Figure 14:
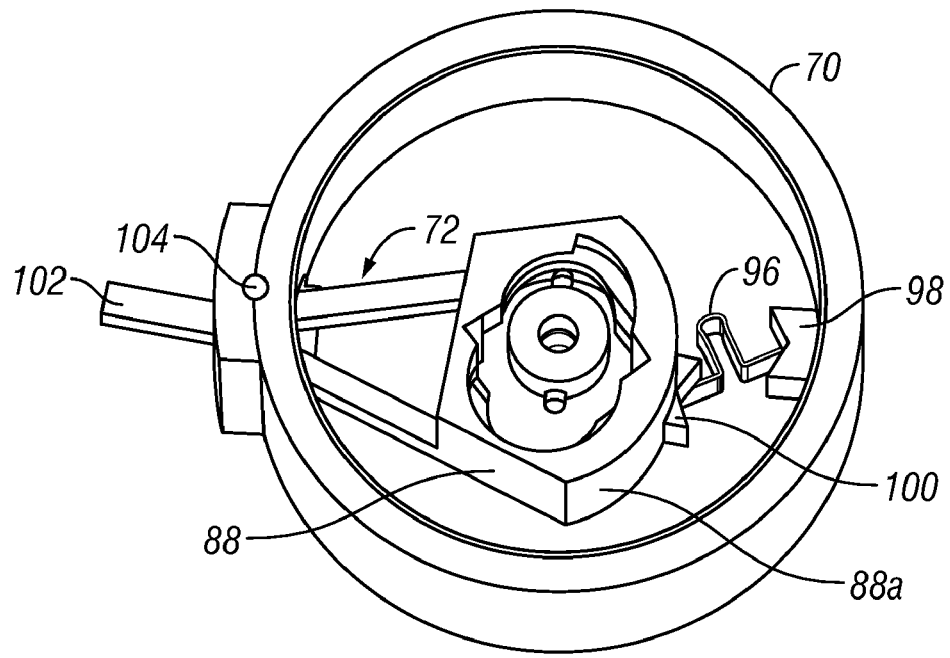
FIGS. 14 and 15 are enlarged plan views of the structure and operation of the shift fork and helical driver of the sprinkler of FIGS. 1-4 in different shift states.
Figure 15:
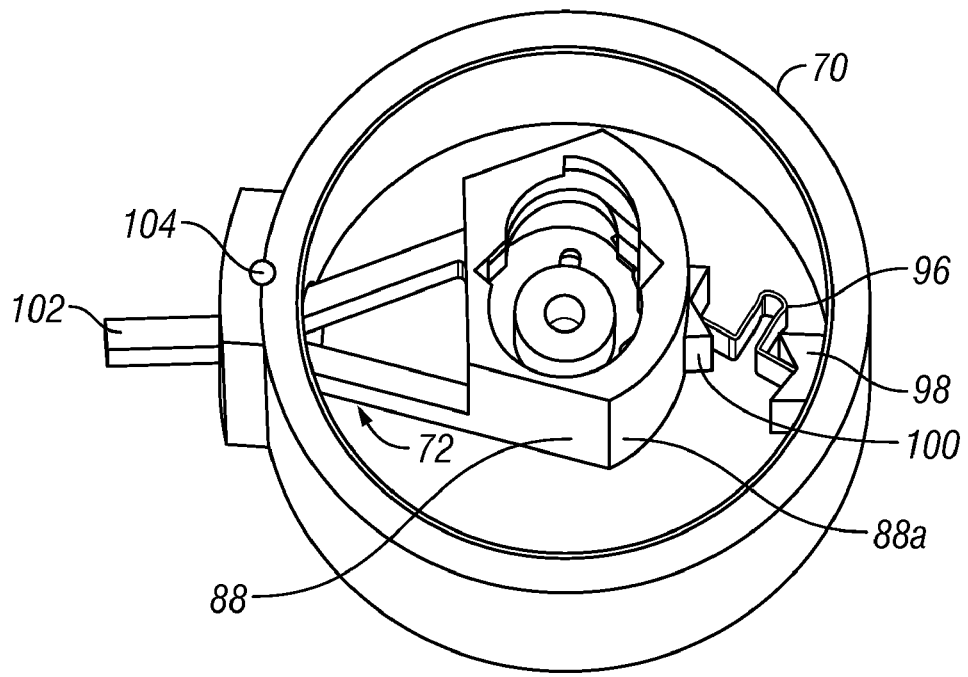
Figure 22:
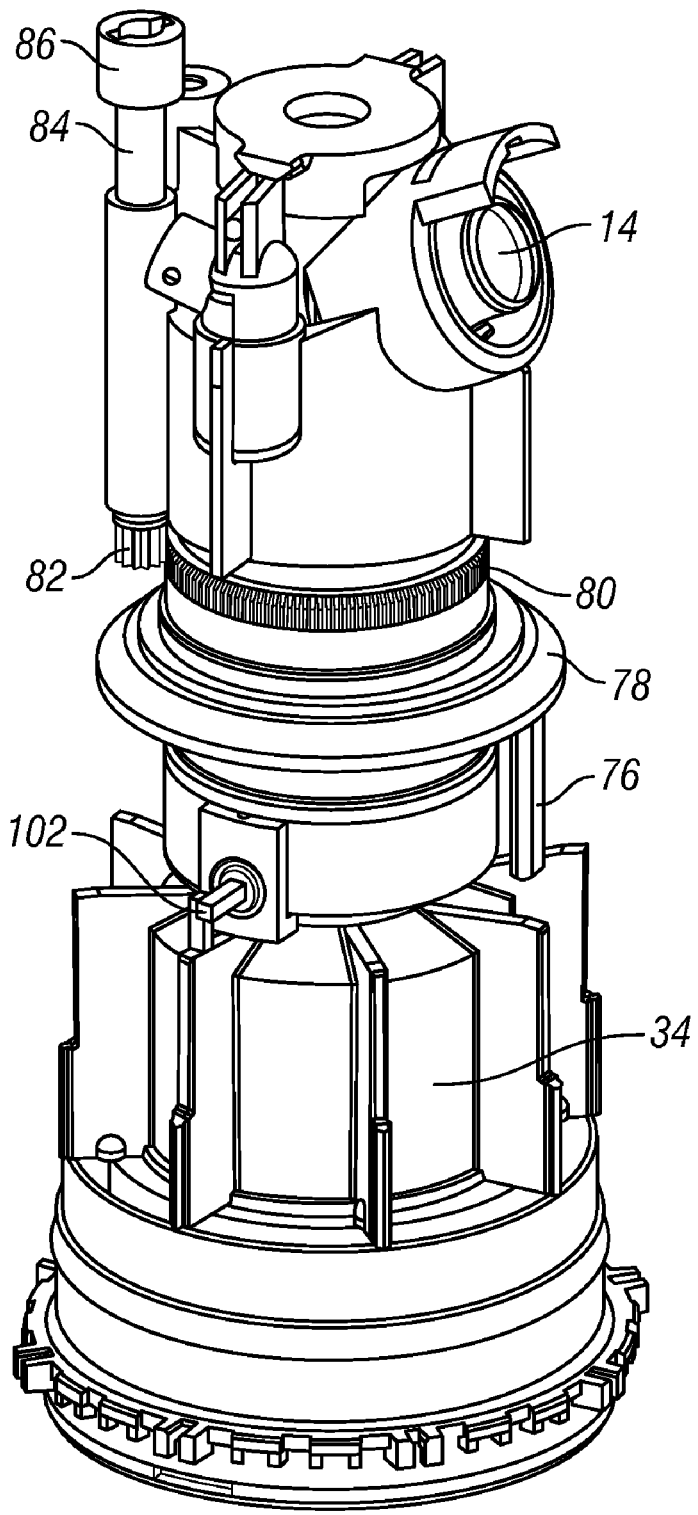
FIG. 22 is an isometric view of the reversing planetary gear drive and internal structure of the nozzle turret of the sprinkler of FIGS. 1-4.

FIGS. 14 and 15 are enlarged plan views illustrating the structure and operation of a shift fork 72 and a helical driver 74 of the reversing mechanism 13 in different shift states. The shift fork 72 is moved back and forth by a pair of shift tabs. One shift tab (not illustrated) is fixed, while the other shift tab 76 (FIGS. 5 and 22) is movable to set the size of the arc through which the nozzle 14 oscillates. The outer case 18 of the sprinkler is adjusted rotationally on its coupling so that the arc covered by the stream of water ejected by the nozzle 14 coincides with the area to be watered. The moveable shift tab 76 extends downwardly from an adjustment sleeve 78 having an integral spur gear 80 that is engaged by a pinion gear 82 on the lower end of an arc adjustment shaft 84. The upper end of the arc adjustment shaft 84 has a cylindrical collar 86 configured for locking engagement with a HUNTER arc adjustment tool inserted into the top of the nozzle turret 26. The HUNTER arc adjustment tool has been widely used for many years and is illustrated in FIG. 8 of U.S. Pat. No. 6,042,021 of Mike Clark granted Mar. 28, 2000 and assigned to Hunter Industries, Inc., the entire disclosure of which is hereby incorporated by reference.

Figure 11:
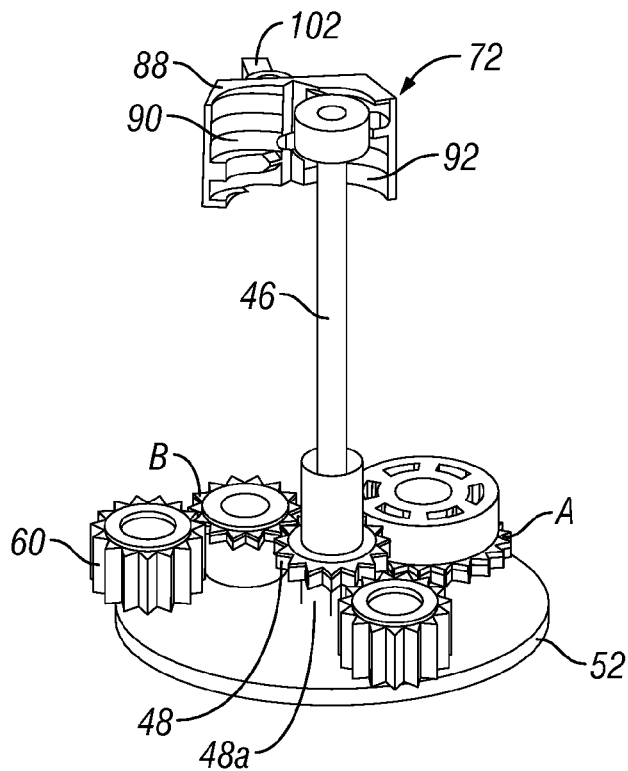
Figure 16:
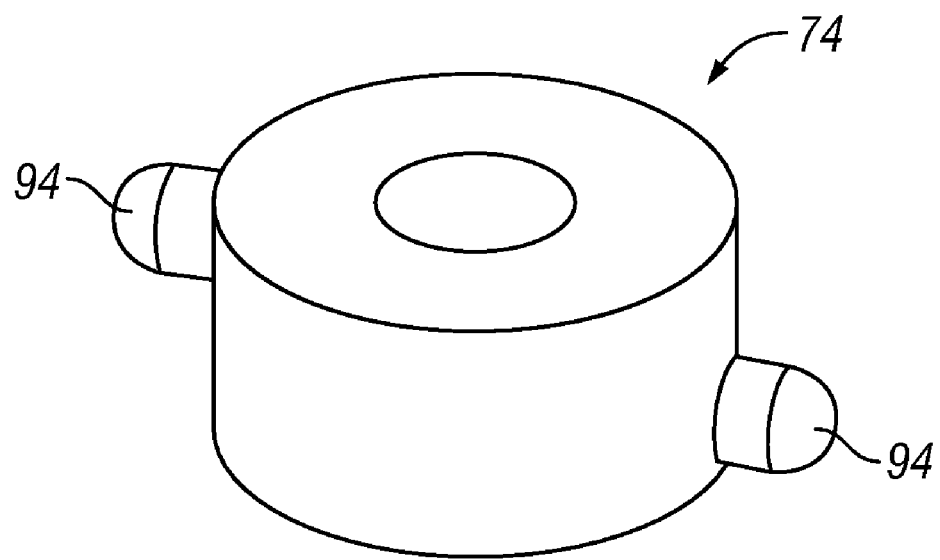
FIG. 16 is an enlarged isometric view of the helical driver.
Figure 17:
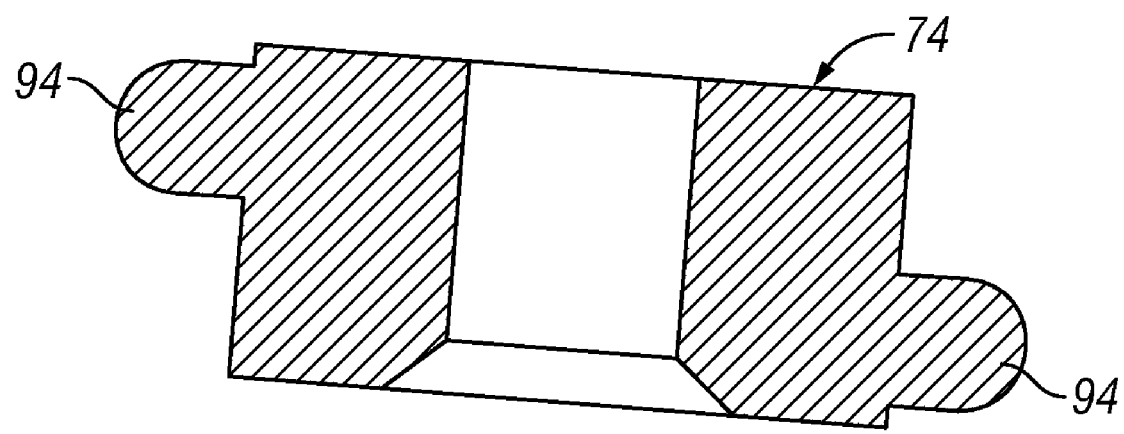
FIG. 17 is an enlarged vertical sectional view of the helical driver.
Figure 19:
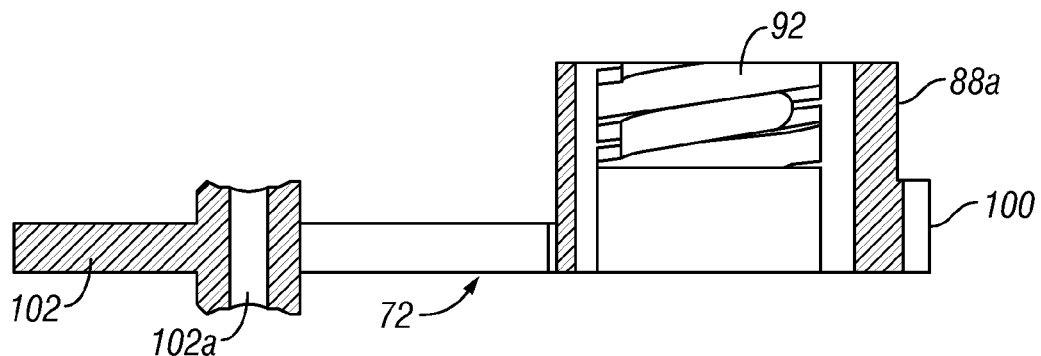
FIG. 19 is an enlarged vertical sectional view of the shift fork taken along line 19-19 of FIG. 18.

The shift fork 72 has a frame member 88 that includes two adjoining laterally spaced helically threaded part-cylinder segments 90 and 92 (FIGS. 11 and 19). The segments 90 and 92 are opposite threaded. Therefore, when the vertically spaced, diametrically extending arms 94 (FIGS. 16 and 17) of the helical driver 74 engage the threads of the segment 90 the helical driver 74 will move vertically in one direction. When the shift fork 72 is pivoted so that the arms 94 of the helical driver 74 engage the threads of the other segment 92 the helical driver 74 will move vertically in the opposite direction. Since the helical driver 74 is rigidly connected to the upper end of the drive shaft 46 this moves the shift sun gear 48 between its raised and lowered states.

Figure 10:
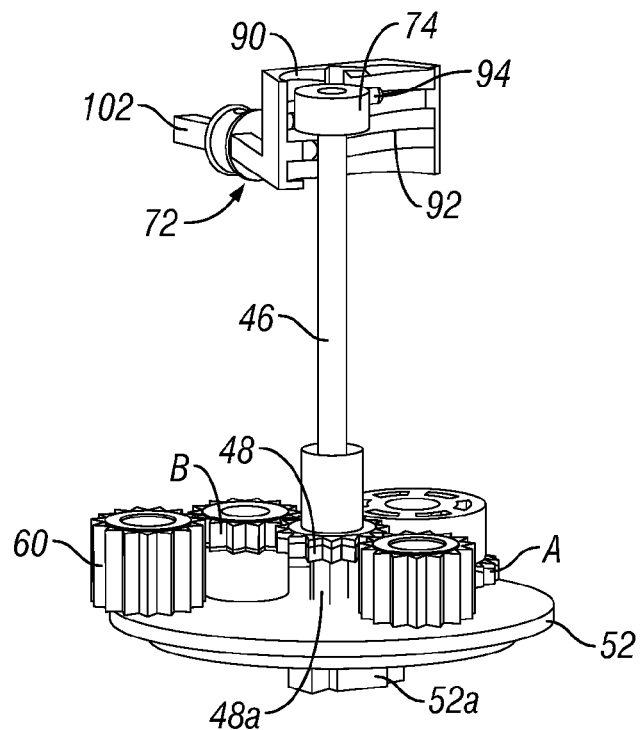
FIGS. 10-13 are sequence of similar views illustrating the manner in which the reversing planetary gear drive of FIGS. 6-9 reverses the direction of rotation of the nozzle of the sprinkler of FIGS. 1-4.
Figure 12:
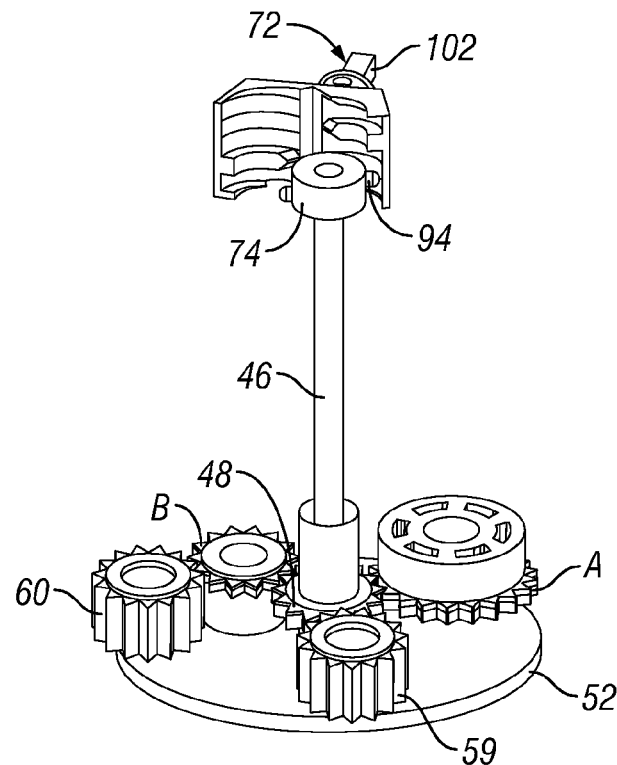

FIG. 10 illustrates the helical driver 74 engaging the threaded segment 90 when the shift sun gear 48 is in its raised state and engaged with the shift gear B. In FIG. 11, the shift fork 72 has pivoted so that the helical driver 74 is now engaging the other threaded segment 92. Continued rotation of the drive shaft 46 causes the helical driver 74 to move downwardly, moving the shift sun gear 48 to its lowered state and into engagement with the shift gear as illustrated in FIG. 12. Thereafter, the shift fork 72 is pivoted again as illustrated in FIG. 13 so that the helical driver 74 once again engages the threaded segment 90. Continued rotation of the drive shaft 46 then moves the shift sun gear 48 back into engagement with the shift gear B as illustrated in FIG. 10.

Figure 18:
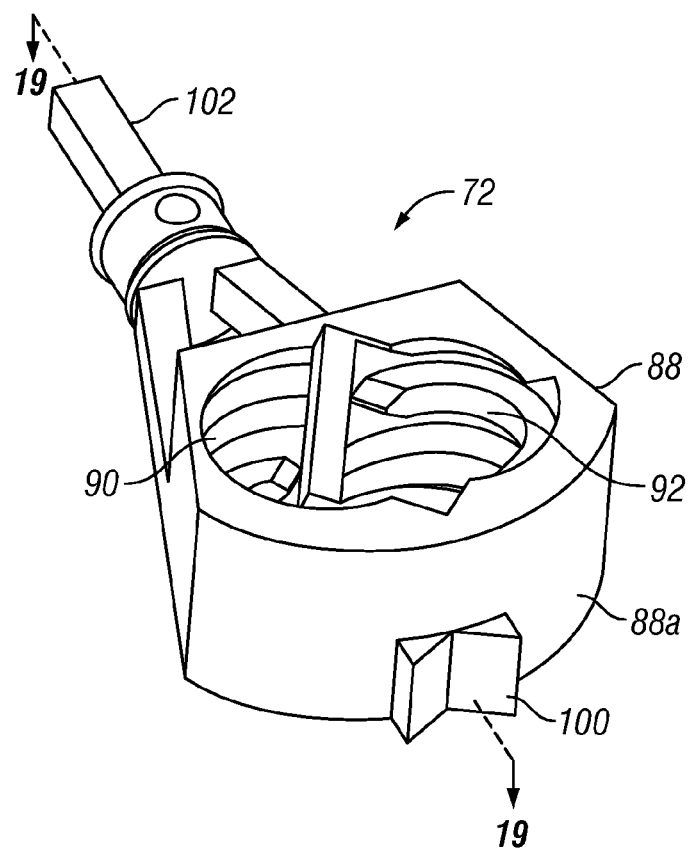
FIG. 18 is an enlarged isometric view of the shift fork.
Figure 20:
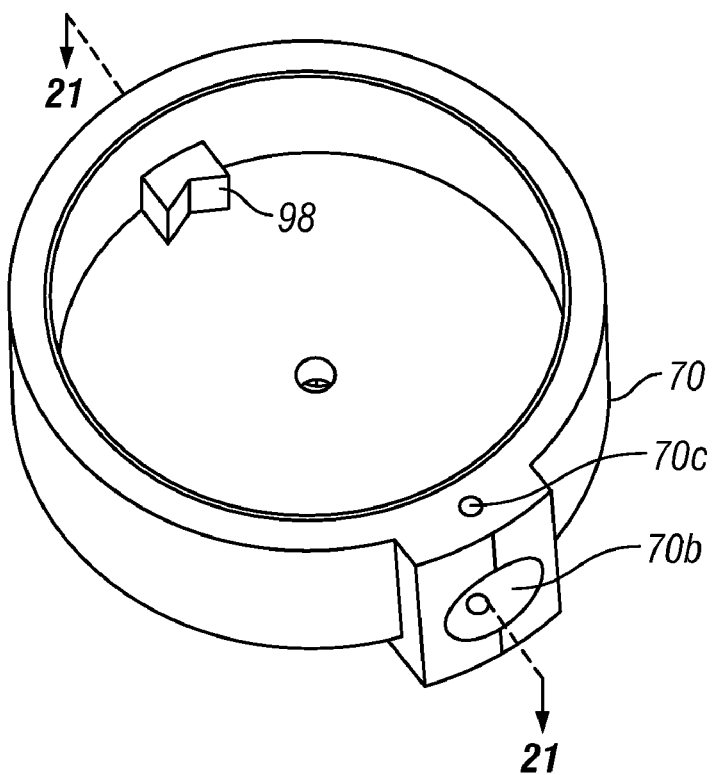
FIG. 20 is an enlarged isometric view of the reversing housing of the sprinkler of FIGS. 1-4.

Referring to FIGS. 14 and 15, the shift fork 72 is biased over-center by a stainless steel Omega spring 96 whose ends are captured in a pair of V-shaped holders 98 and 100 formed on the interior of the reversing assembly housing 70 and the forward curved end 88a (FIGS. 18 and 19) of the frame member 88 of the shift fork 72, respectively. A lever 102 of the shift fork 72 extends through a hole 70b (FIGS. 20, 21 and 22) in the wall of the reversing assembly housing 70 and is pivotally connected thereto by a pivot shaft 104. The pivot shaft 104 extends through a hole 70c in the housing 70 and a hole 102a in the lever 102. The lever 102 is alternately engaged by the two shift tabs, including the adjustable shift tab 76, to move the shift fork 72 back and forth between its two positions illustrated in FIGS. 14 and 15, with the aid of over-center spring 96.

Referring to FIG. 4, a housing cap 106 seals the top of the reversing assembly housing 70. A housing coupler 108 joins a central projection 106a of the housing cap 106 and a central mandrel 110 of the nozzle turret 26. Thus the reversing mechanism 13 carries and rotates the nozzle turret 26 and the nozzle 14 contained therein. The housing 70 of the reversing mechanism 13 is slowly rotated clockwise and counter-clockwise by the output carrier 58 of the planetary gear drive 12. When the lever 102 of the of the shift fork 72 is pivoted by either of the shift tabs, such as the movable shift tab 76, the direction of rotation of the output carrier 58 reverses, thus reversing the direction of rotation of the nozzle turret 26.

Thus the sprinkler 10 uses the planetary gear drive 12 to change the direction of rotation of the nozzle turret 26. The overall reversing mechanism of the sprinkler 10 has two portions, namely, the reversing mechanism 13 that is external of the planetary gear drive 12, and another portion that is contained within the planetary gear drive 12 that includes the shift sun gear 48, shift gear A and shift gear B. The advantage of including at least a portion of the overall reversing mechanism in the planetary gear drive 12 itself is that the shifting can be done in a low torque region of the drive where damage and wear to gears is much less likely to occur. This eliminates the need to use conventional arc-shaped shifting frames with delicate pinion gears that engage a bull ring gear assembly and bear large loads.

While I have described and illustrated in detail an embodiment of a sprinkler with a reversing planetary gear drive, it should be understood that my invention can be modified in both arrangement and detail. For example, while in the illustrated embodiment only a portion of the reversing mechanism in contained inside the gear box 34, all of the mechanisms inside the reversing assembly housing 70 could be contained within the gear box 34. The configuration of the reversing mechanism for reciprocating the shift sun gear 48 could be varied. The sprinkler 10 could be modified to include the automatic arc return mechanism such as that disclosed in pending U.S. patent application Ser. No. 11/612,801 of John D. Cooks filed Dec. 19, 2006 assigned to Hunter Industries, Inc., the entire disclosure of which is hereby incorporated by reference. Clutches and other means could be used for engaging a subset of the planetary gears. Therefore the protection afforded my invention should only be limited in accordance with the following claims.

I claim:

1. A sprinkler, comprising:
   a turbine;
   a nozzle; and
   a planetary gear drive and a reversing mechanism rotatably coupling the turbine and the nozzle, the planetary gear drive including at least a portion of the reversing mechanism having a shift gear that reciprocates between raised and lowered positions to engage different non-shifting gears and thereby change a direction of rotation of subsequent stages of the planetary gear drive.

2. The sprinkler of claim 1 and further comprising a riser enclosing the planetary gear drive, an outer case surrounding the riser, and a coil spring surrounding the riser and normally holding the riser in a retracted position within the case and compressible to allow the riser to telescope to an extended position when pressurized water is introduced into the case.

3. The sprinkler of claim 1 wherein the nozzle is carried inside a nozzle turret rotatably mounted to the upper end of the riser.

4. The sprinkler of claim 1 wherein the planetary gear drive includes a gear box with a ring gear formed on an interior wall of the gear box.

5. The sprinkler of claim 1 wherein the shift gear is coupled to a lower end of a drive shaft and the reversing mechanism includes a second portion having a helical driver coupled to an upper end of the drive shaft.

6. The sprinkler of claim 5 wherein the second portion of the reversing mechanism further includes a shift fork having a pair of oppositely threaded segments that are alternately engaged by the helical driver when a lever of the shift fork is moved back and forth.

7. The sprinkler of claim 6 wherein the second portion of the reversing mechanism further has a pair of shift tabs for engaging the shift fork.

8. The sprinkler of claim 7 wherein a position of at least one of the shift tabs is adjustable to select the size of an arc through which the nozzle oscillates.

9. The sprinkler of claim 8 and further comprising means for enabling the position of the adjustable shift tabs to be selected from a top end of the sprinkler using a tool.

10. A sprinkler, comprising:
    a turbine;
    a gear train reduction connected to the turbine including a plurality of stages each having sun gears engaged with planet gears, one of the stages including a reciprocating shift sun gear for shifting a direction of rotation of an output stage of the gear train reduction;
    a nozzle turret; and
    reversing means coupling the output stage of the gear train reduction and the nozzle turret for rotating the nozzle turret and changing a direction of rotation of the nozzle turret.

11. The sprinkler of claim 10 wherein the reversing means includes means actuable by shift tabs carried by the nozzle turret for shifting the reciprocating the shift sun gear to change a direction of rotation of the nozzle turret.

12. The sprinkler of claim 10 and further comprising a riser enclosing the gear train reduction, an outer case surrounding the riser, and a coil spring surrounding the riser and normally holding the riser in a retracted position within the case and compressible to allow the riser to telescope to an extended position when pressurized water is introduced into the case.

13. The sprinkler of claim 10 wherein the nozzle turret is rotatably mounted to the upper end of the riser.

14. The sprinkler of claim 10 wherein the reversing means reciprocates the shift sun gear.

15. The sprinkler of claim 14 wherein the shift sun gear is coupled to a lower end of a drive shaft and the reversing means includes a helical driver coupled to an upper end of the drive shaft.

16. The sprinkler of claim 15 wherein the reversing means includes a shift fork having a pair of oppositely threaded segments that are alternately engaged by the helical driver when a lever of the shift fork is moved back and forth.

17. The sprinkler of claim 16 wherein the sprinkler further comprises a pair of shift tabs for engaging the shift fork.

18. The sprinkler of claim 17 wherein a position of at least one of the shift tabs is adjustable to select the size of an arc through which the nozzle oscillates.

19. A sprinkler, comprising:
an outer case;
a riser moveable between retracted and extended positions inside the outer case;
a planetary gear drive mounted inside the riser;
a turbine connected to an input shaft of the planetary gear drive;
a nozzle turret; and
a reversing mechanism coupling an output stage of the planetary gear drive and the nozzle turret including a mechanism that vertically shifts a gear within the planetary gear drive to shift a direction of rotation of the output stage.

20. A sprinkler, comprising:
a turbine;
a nozzle; and
a planetary gear drive and a reversing mechanism rotatably coupling the turbine and the nozzle, the planetary gear drive including at least a portion of the reversing mechanism, the planetary gear drive including a shift sun gear that reciprocates between raised and lowered positions to engage different planet gears and thereby change a direction of rotation of subsequent stages of the planetary gear drive.

* * * * *